US011351621B2

(12) United States Patent
LeVey

(10) Patent No.: US 11,351,621 B2
(45) Date of Patent: *Jun. 7, 2022

(54) POSITIONING AND CLAMPING SYSTEM FOR THREAD ROLLING

(71) Applicant: Vey Manufacturing Technologies LLC, Chicago, IL (US)

(72) Inventor: Kenneth Roger LeVey, Chicago, IL (US)

(73) Assignee: Vey Manufacturing Technologies LLC, Chicago, IL (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/923,734

(22) Filed: Jul. 8, 2020

(65) Prior Publication Data
US 2020/0331081 A1 Oct. 22, 2020

Related U.S. Application Data

(63) Continuation-in-part of application No. 16/514,641, filed on Jul. 17, 2019, now Pat. No. 10,710,145.
(Continued)

(51) Int. Cl.
*B21D 43/00* (2006.01)
*B23G 5/08* (2006.01)

(52) U.S. Cl.
CPC .......... *B23G 5/083* (2013.01); *B21D 43/003* (2013.01)

(58) Field of Classification Search
CPC . B21H 3/06; B21H 3/02; B21D 37/04; B21D 37/14; B21D 43/003
See application file for complete search history.

(56) References Cited

U.S. PATENT DOCUMENTS

| 470,805 A | 3/1892 | Jones |
| 503,393 A | 8/1893 | Vollmer |

(Continued)

FOREIGN PATENT DOCUMENTS

| DE | 3008113 | 4/1981 |
| DE | 3535282 | 4/1986 |

(Continued)

OTHER PUBLICATIONS

International Search Report and Written Opinion for PCT/US2019/042236 dated Oct. 24, 2019.
(Continued)

*Primary Examiner* — Debra M Sullivan
(74) *Attorney, Agent, or Firm* — Christopher M. Scherer; DeWitt LLP

(57) ABSTRACT

The present invention is a die positioning system for use in positioning mobile or fixed dies. The system includes a pair of key bars, a pair of key disc inserts, a set of key discs, and a set of disc backers. The key bars and key discs serve to offset manufacturing dies or die holders. Using key bars and/or key discs from different pairs of key bars and/or sets of key discs also allows for precise angulation of the dies or die holders. The key discs are held in place between the die and die holder, or between the die holder and key base, by the key disc inserts and angled (if feasible) by the disc backers. The key bars, located between the key disc inserts and the die or die holder allow additional offset of the die or die holder. The solid, stacked configuration of the key bars and key discs prevents the die or die holder from gradually or suddenly losing its positioning.

20 Claims, 9 Drawing Sheets

Related U.S. Application Data

(60) Provisional application No. 62/801,966, filed on Feb. 6, 2019, provisional application No. 62/723,246, filed on Aug. 27, 2018.

(56) References Cited

U.S. PATENT DOCUMENTS

| | | | |
|---|---|---|---|
| 2,367,398 | A | 1/1945 | Hoern |
| 2,548,137 | A | 4/1951 | Appleton |
| 2,603,879 | A | 7/1952 | Joachim |
| 3,726,118 | A | 4/1973 | Van De Meerendonk |
| 3,765,209 | A | 10/1973 | Petrikovsky |
| 3,879,976 | A | 4/1975 | Morton |
| 3,926,026 | A | 12/1975 | Jackson |
| 4,583,385 | A | 4/1986 | Jackson |
| 4,754,631 | A | 7/1988 | Jackson |
| 8,984,922 | B2 | 3/2015 | Roth |
| 10,710,145 | B2 * | 7/2020 | LeVey .................. B21H 3/06 |
| 2010/0126073 | A1 | 5/2010 | Schroeder |
| 2018/0056367 | A1 | 3/2018 | Levey |

FOREIGN PATENT DOCUMENTS

| | | |
|---|---|---|
| DE | 10259665 | 7/2004 |
| EP | 1072337 | 1/2001 |
| EP | 2380678 | 10/2011 |
| GB | 2044151 | 10/1980 |
| JP | 56045242 | 4/1981 |
| JP | 2003033842 | 2/2003 |
| WO | 8001886 | 9/1980 |

OTHER PUBLICATIONS

Office Action for U.S. Appl. No. 15/685,845 dated Oct. 25, 2019.
Search Report for EP17844526.8 dated Mar. 25, 2020.
International Preliminary Report on Patentability for International application No. PCT/US2019/042236, dated Mar. 11, 2021 from WIPO.

* cited by examiner

POSITIONING AND CLAMPING SYSTEM FOR THREAD ROLLING

CROSS-REFERENCE TO RELATED APPLICATIONS

This application is a continuation-in-part and claims the benefit of prior-filed, co-pending U.S. patent application Ser. No. 16/514,641, filed on Jul. 17, 2019, which claims the benefit of prior-filed, U.S. Provisional Patent Applications Nos. 62/723,246, filed on Aug. 27, 2018, and 62/801,966, filed on Feb. 6, 2019, the contents of which are incorporated herein by reference in their entirety.

BACKGROUND OF THE INVENTION

The present disclosure is directed to a system for mechanical die-based manufacture of threaded fasteners.

Thread rolling to manufacture bolts, screws, and other threaded fasteners requires rapid rolling of fastener blanks between a mobile die and a stationary die to form the thread. The manufacturing apparatus reciprocates the mobile die back and forth relative to the stationary die at a high rate of speed, often hundreds of reciprocations in a minute. Because many different blank and thread configurations may be used with and required from one manufacturing apparatus, numerous different dies can be interchangeably used with the same machine. While switching out dies may change the thread patterns, accommodating the different size and shape of the blanks usually falls to the die holders of the apparatus. Such holders typically include an adjustment mechanism which can alter the location and angulation of the dies to accommodate different blanks.

All current manufacturing equipment requires adjustment to the pressure and distance between the faces of the dies, and occasionally the angulation of one or both of the dies. The industry's standard practice uses a threaded adjustment to properly position the die faces. Operators may require several years of training to learn the appropriate "feel" required for current adjustment methods to produce good fasteners, often resulting in unusable batches of product during the long training period. Furthermore, such adjustment mechanisms can be shifted out of position accidentally or over the course of production. Moreover, due to the rapid reciprocating movement of the mobile die and its respective mobile die holder, as well as the cantilevered positioning of the mobile die holder on the apparatus, the mobile die holder may be subject to forces which move it out of alignment, creating further waste of time and material.

It is therefore the object of this application to provide a die positioning system which provides accurate, easily reproducible positioning of at least one die and its corresponding die holder over long periods of high use.

BRIEF SUMMARY

One embodiment of the present invention is a die positioning system including multiple pairs of key bars, at least one pair of key disc inserts, multiple sets of key discs, and at least one set of disc backers. Each key bar of the pair of key bars has a solid rectangular cuboid configuration identical to the other key bar of the pair of key bars. Each key disc of the set of key discs has a solid three-dimensional shape and size identical to the other key discs of the set of key discs. Each key disc insert has at least one disc aperture extending therethrough, each key aperture having a diameter and a shape conforming to the outer periphery of each key disc. The forward surface of each disc backer includes a backer surface having a non-planar configuration.

Another embodiment of the present invention is a die positioning system including at least one pair of key bars, at least one pair of key disc inserts, at least one set of key discs, and at least one set of disc backers according to the system shown above. The system also includes at least one bearing mounted to a base slide and at least one slide rail mounted to a moving slide. The mounted slide has a line of motion, with the bearing mounted to the base slide such that the axis of rotation of each of the bearing is orthogonal to the line of motion. The slide rail receives the bearing such that the bearing contacts at least one of an upper inner surface of the slide rail or a lower inner surface of the slide rail.

BRIEF DESCRIPTION OF THE DRAWING(S)

Figure 3A:
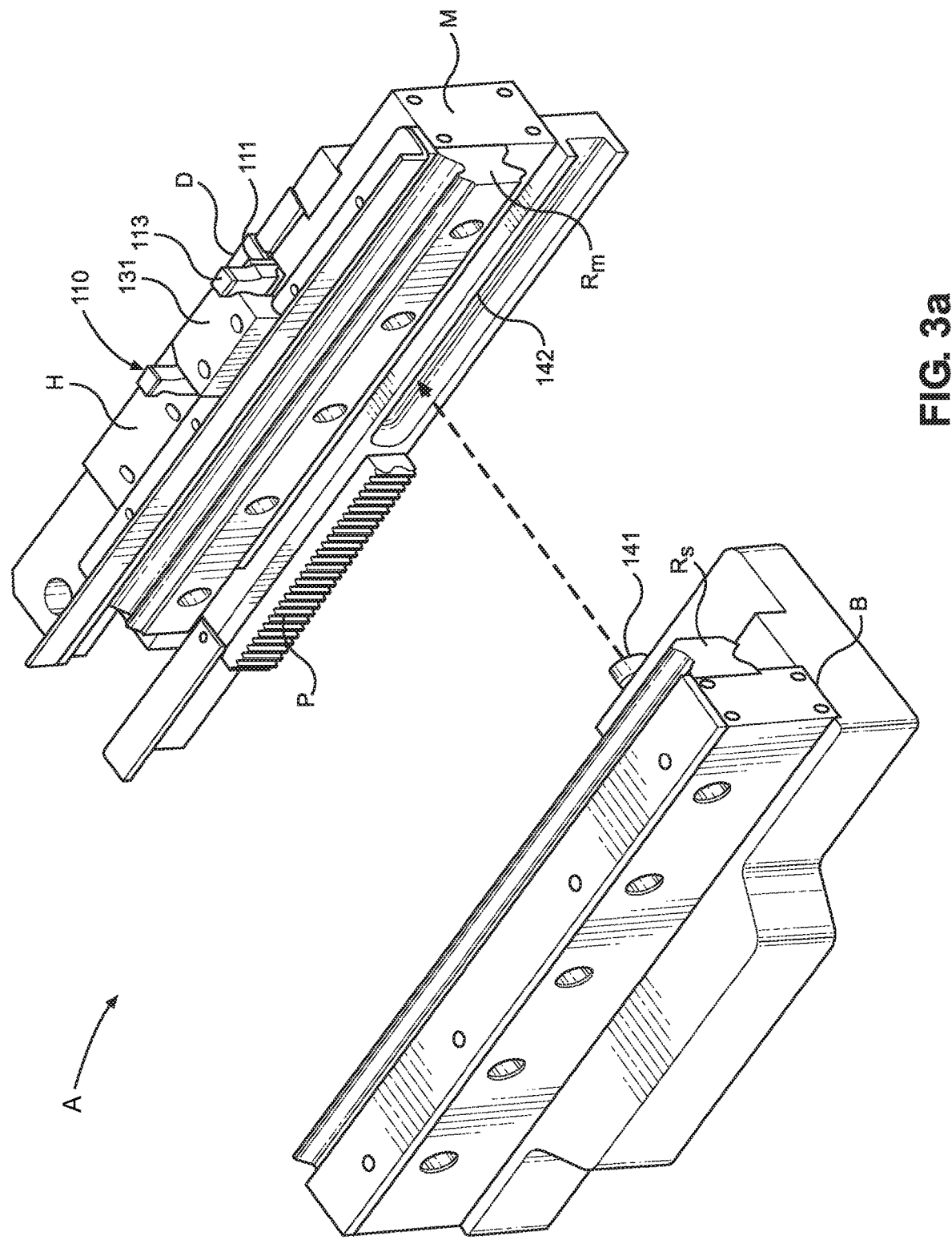
Figure 3B:
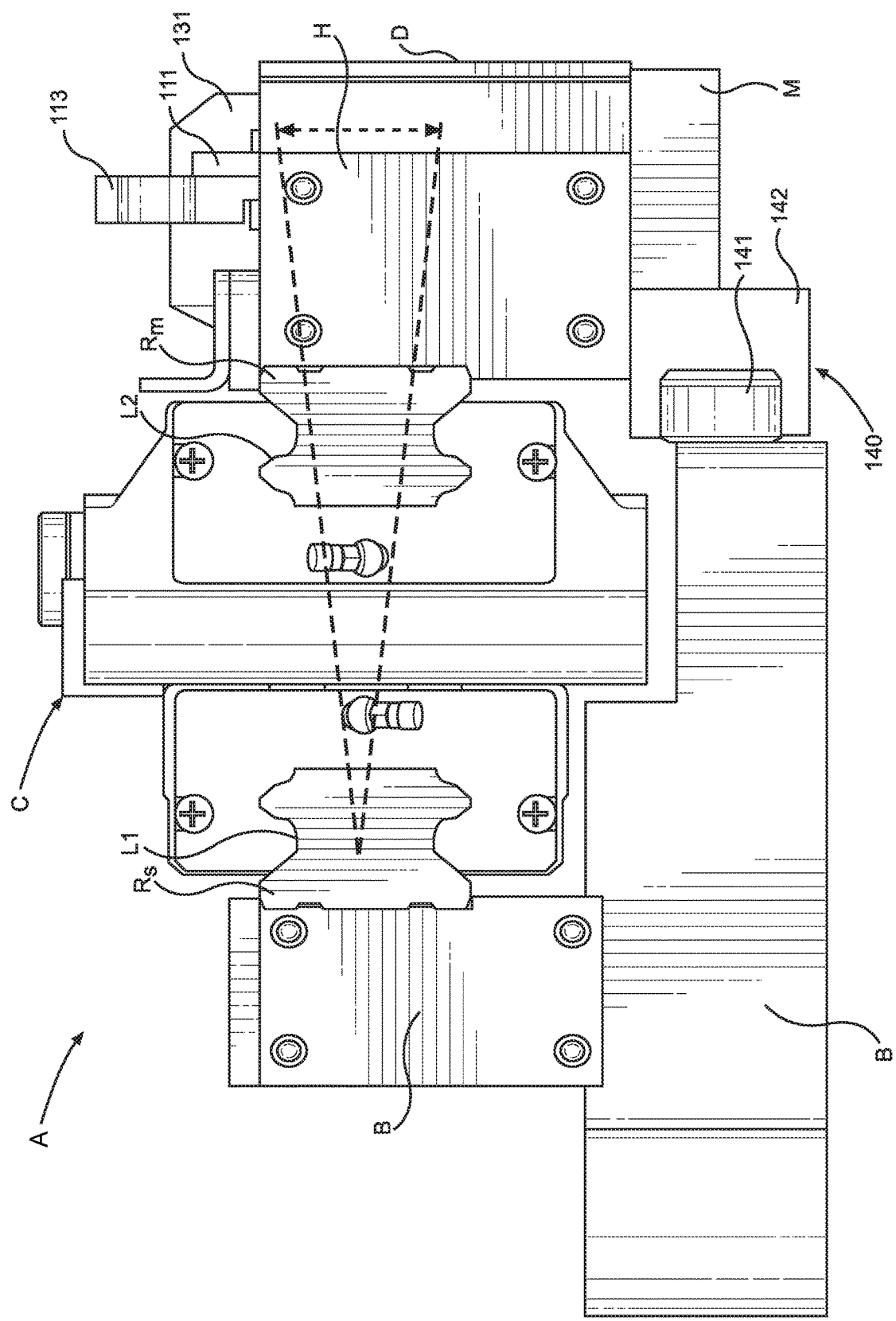
Figure 3C:
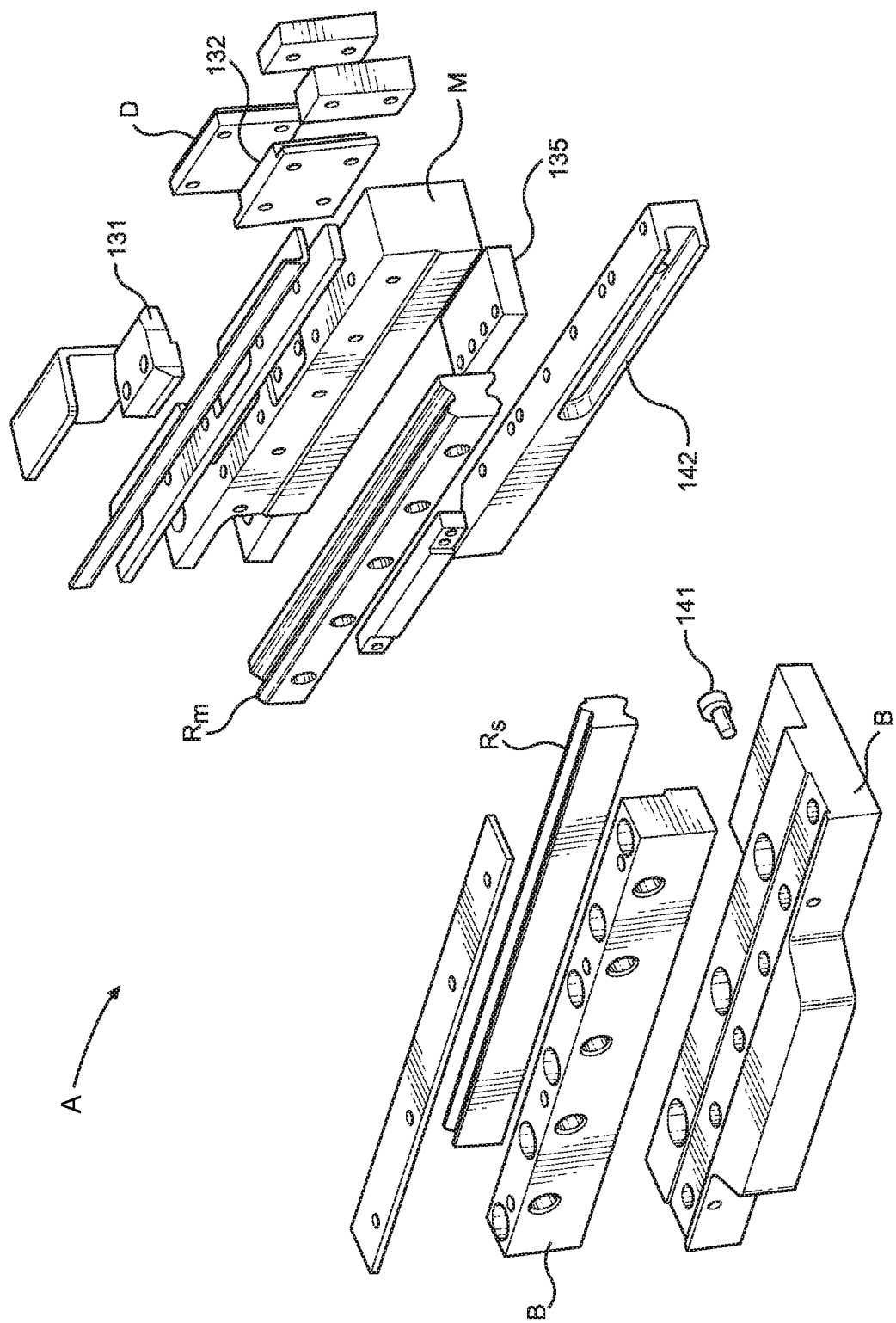

FIGS. 3a, 3b, and 3c show partial perspective, cross-sectional, and exploded views, respectively, of a bearing assembly which may be used in conjunction with, or separately from the key system and the disc adjustment assembly.

It should be understood that for clarity, not every part is labeled in every drawing. Lack of labeling should not be interpreted as a lack of disclosure.

DETAILED DESCRIPTION OF THE INVENTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Dimensions and materials identified in the drawings and applications are by way of example only and are not intended to limit the scope of the claimed invention. Any other dimensions and materials not consistent with the purpose of the present application can also be used. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1A:
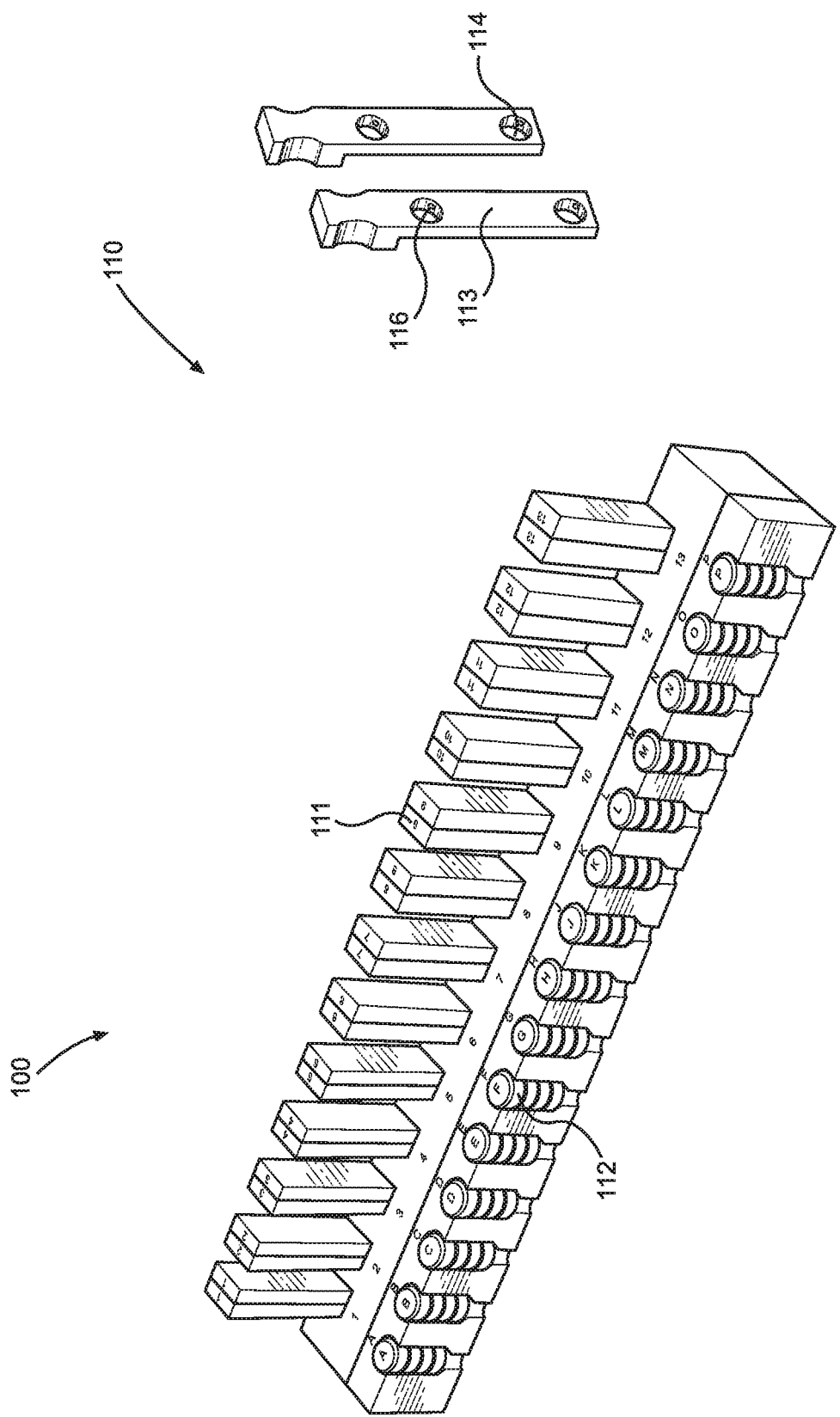
FIGS. 1a and 1b depict perspective views of one embodiment of a key system and a disc adjustment assembly for use in a die positioning system.
Figure 1B:
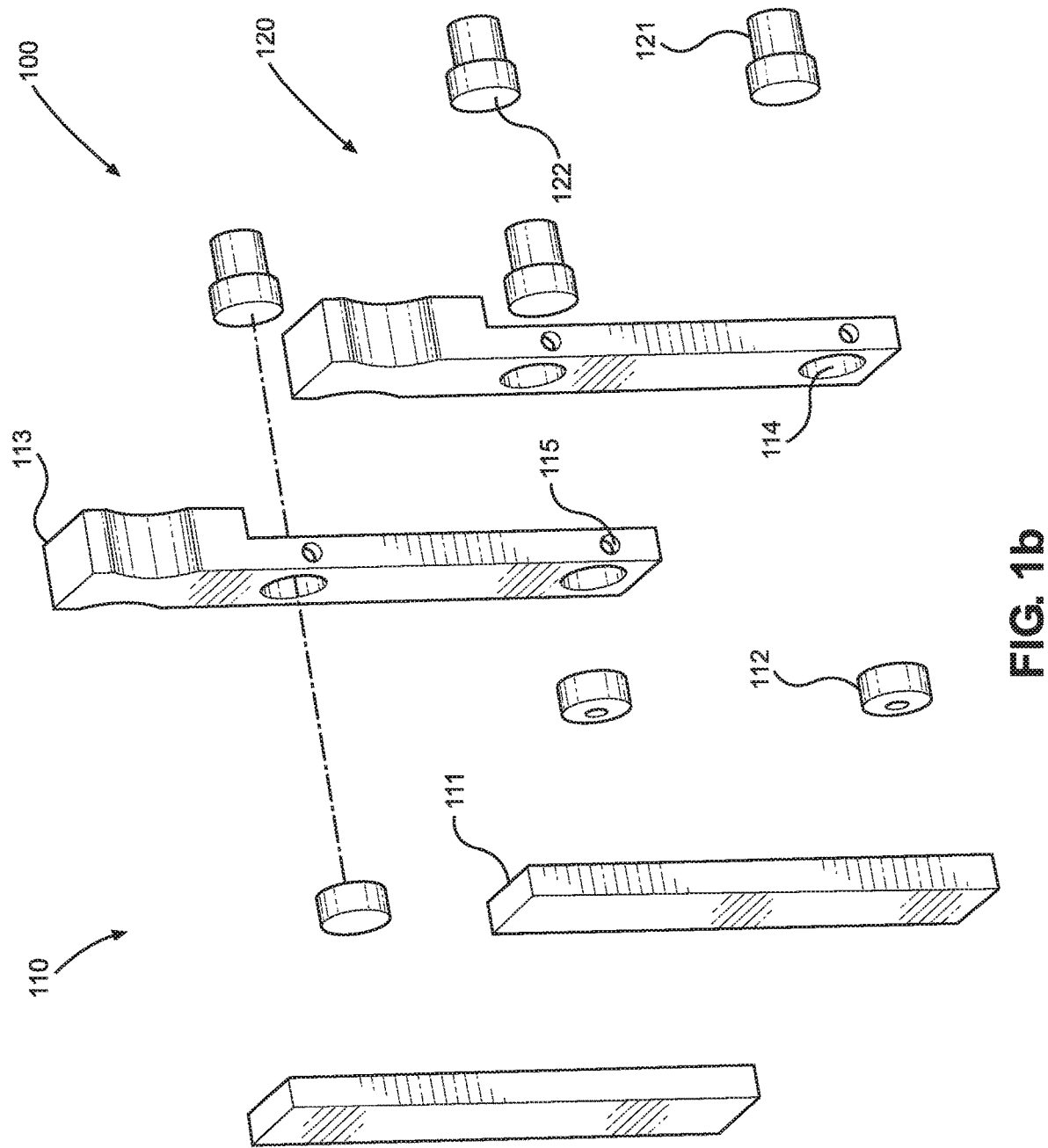

FIGS. 1a and 1b present perspective views of one embodiment of key system 110 for use in a die positioning system 100. Each key system 110 includes a plurality of pairs of key bars 111, a plurality of sets of key discs 112, and at least one pair of key disc inserts 113. In the exemplary embodiment of FIG. 1a, system 100 includes 13 pairs of key bars 111, 15 sets of key discs 112, and one pair of key disc inserts 113. Other embodiments may include more or fewer pairs of key bars 111, sets of key discs 112, and pairs of key disc inserts 113.

Each key bar 111 of each pair of key bars 111 is a solid rectangular cuboid having an identical thickness within the pair, but differing from the thickness of other pairs of key bars 111 in the key system 110. Pairs of key bars 111 typically differ in thickness at increments of approximately 0.01 inches, though other increments are possible. Each pair of key bars 111 may be uniquely marked within the key system 110 by alphanumeric and/or colored indicia for identification and separation from other pairs of key bars 111.

Each key disc 112 of each set of key discs 112 is a solid three-dimensional shape having an identical thickness within the set, but differing from the thickness of other sets of key discs 112 in the key system 110. While the key discs 112 shown in the instant figures are cylindrical, other three-dimensional shapes, such as cuboids, cubes, hemispheres, prisms, and/or any combination thereof, are contemplated and encompassed by the claims of this application. Sets of key discs 112 typically include four key discs 112, though other embodiments may use more or fewer key discs 112. Sets of key discs 112 typically differ in thickness at increments of approximately 0.001 inches, though other intervals are possible. Each set of key discs 112 may be uniquely marked within the key system 110 by alphanumeric and/or colored indicia for identification and separation from other sets of key discs 112. Sets of key discs 112 may be used completely or may be "mixed and matched" with key discs from another set to angle a stationary die D or a mobile die D.

Each key disc insert 113 includes at least one disc aperture 114 designed to receive and hold a single key disc 112. The key aperture 114 has a diameter greater than the key disc 112, and a shape conforming to the outer periphery of the key disc 112. In the exemplary embodiment of FIGS. 1a and 1b, each key disc insert 113 includes two disc apertures 114, though other embodiments may use more or fewer key disc apertures 114. Each key disc insert 113 has a stepped configuration between a thicker section and a thinner section. The thinner section is equal in thickness to or thinner than the thinnest set of key discs 112 to allow proper biasing using each set of key discs 112 in the key system 110. The thicker section extends above the die holder H with the step holding the key disc insert 113 in place vertically with respect to the die D and the die holder H. In certain embodiments, at least one magnet aperture 115 extends through a sidewall of each disc aperture 114 to accommodate at least one capture magnet 116. The capture magnet 116 helps to hold the key disc 112 in place in the disc aperture 114, as the key discs 112 can be made from a ferromagnetic or ferrimagnetic material.

Figure 1C:
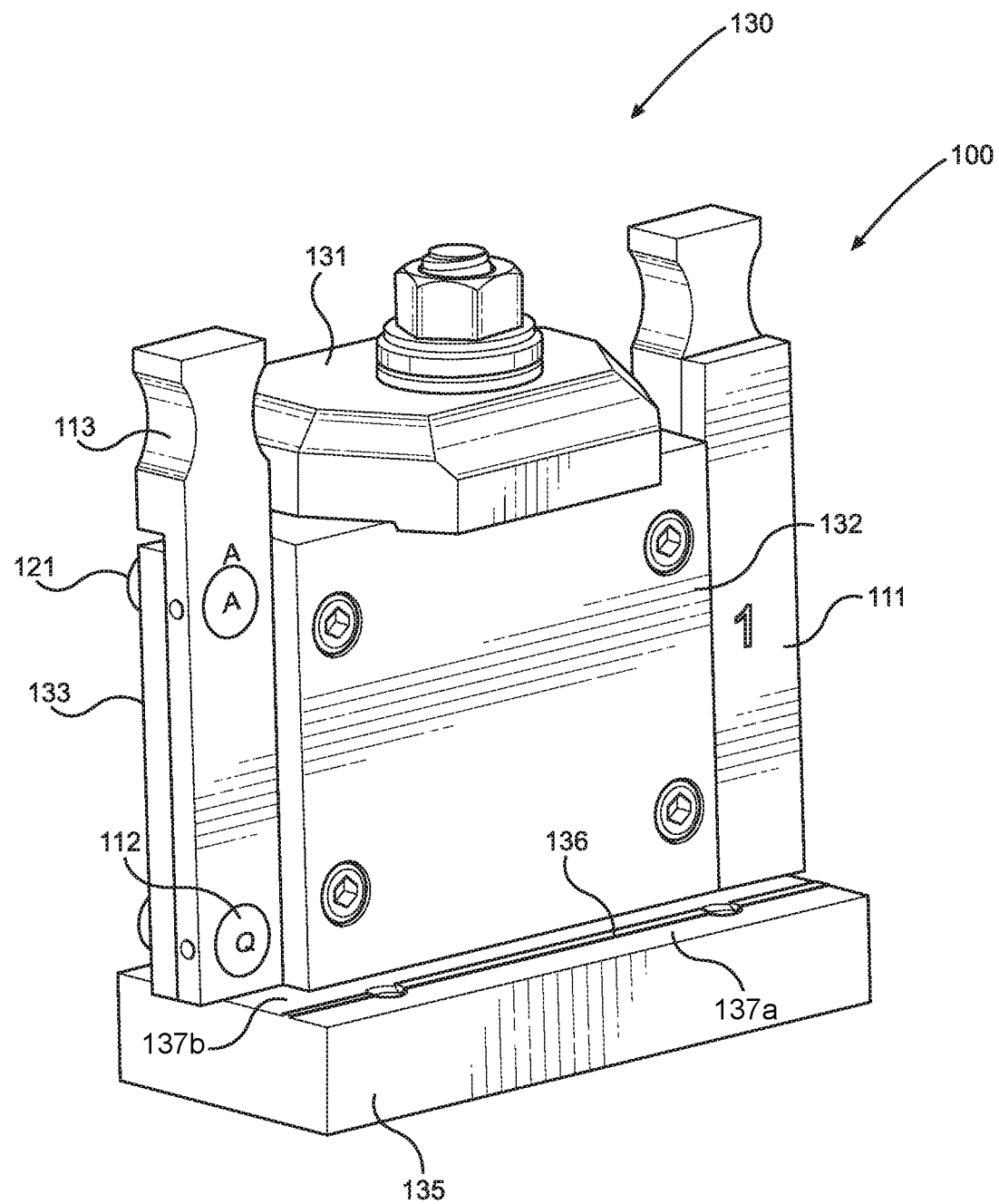
FIGS. 1c and 1d depict partial perspective and partial cross-sectional views, respectively, of the embodiments of the key system and the disc adjustment assembly in use.
Figure 1D:
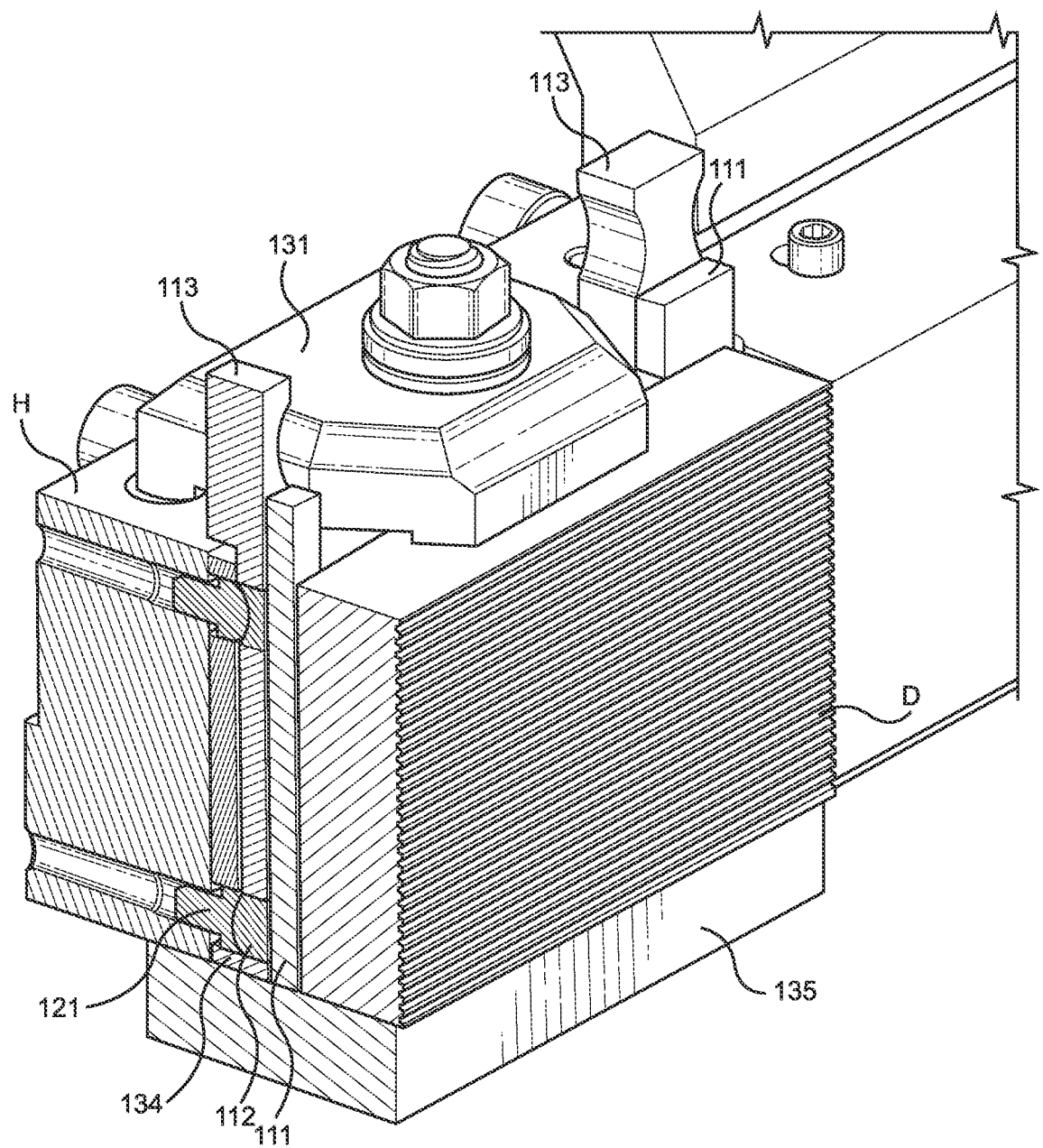

In use, as can be seen in FIGS. 1c and 1d, at least one recess within the die holder H receives a pair of key bars 111 and a pair of key disc inserts 113 in the space between the die D and the die holder H. The key disc inserts 113 hold at least one set of key discs 112. One key bar 111 of the pair of key bars 111 and one key disc insert 113 of the pair of key disc inserts 113 extends along a first end of one side of the die D, while the other key bar 111 of the pair of key bars 111 and the other key disc insert 113 of the pair of key disc inserts 113 extends along a second end of the same side of the die D, as can be seen in FIG. 1d. In the embodiment of FIGS. 1a through 1d, the position of the die D can thereby be adjusted in increments of approximately 0.01 inches by changing the key bars 111 used, and adjusted in increments of approximately 0.001 inches by changing the key discs 112 used.

If a user wishes to create a vertical or horizontal angle for the surface of the die D, they may combine the key discs 112 from different sets. For vertical angulation, the thicker key discs 112 are typically placed in lower disc apertures 114, though reversal is possible. By way of non-limiting example, if a first set of key discs 112 has a thickness of approximately 0.031 inches and a second set of key discs 112 has a thickness of approximately 0.041 inches with a distance between center points of the disc apertures 114 of approximately 0.5 inches, the surface of the die D will have an angulation of approximately 1.1 degrees from vertical if using the thinner key discs 112 in the upper disc apertures 114. It is contemplated that the key discs 112 from any number of different sets of key discs 112 may be used to create vertical and/or horizontal angulation of the die D, depending upon the desired angulation and number of the key discs 112 which can be used within the die positioning system 100.

Each key system 110 can be used with either a stationary or a mobile die D. Because most manufacturing apparatuses include both stationary and mobile dies D, two key systems 110 may be used, one for each die D. Referring back the above example, doubling the angulation, that is, providing similarly differentiated key discs 112 in the key disc inserts 113 for both the mobile and stationary dies D, will result in a fastener having a taper of approximately 2.2 degrees.

As shown in FIGS. 1b through 1d, a disc adjustment assembly 120 allows the key system 110 to be stabilized at any angle. Within the assembly 120, sets of disc backers 121 interact with sets of key discs 112 to allow the key discs 112 to extend at an angle relative to the plane of the die holder H. While the embodiment shown in FIG. 1b includes four disc backers 121, sets with more and fewer disc backers 121 are contemplated to interact with the same number of key discs 112.

The disc backers 121 have backer surfaces 122, non-planar forward surfaces which are placed behind the key discs 112. In the embodiment shown in FIGS. 1b and 1d, the backer surfaces 122 at the front of disc backers 121 have a domed, convex configuration allowing at least partial rotation of the key discs 112 about at least three axes. In other embodiments, the backer surfaces 122 have a spherical or at least partially spherical convex configuration with complementary concave mating surfaces on the backs of the key discs 112, also allowing at least partial rotation of the key discs 112 about at least three axes. The reverse may also be true, with the backer surfaces 122 having a spherical or at least partially spherical concave configuration with complementary convex mating surfaces on the backs of the key discs 112. In certain other embodiments, the backer surfaces 122 have a convex angled configuration, allowing at least partial rotation of the key discs 112 about two axes. All of these configurations prevent the disc backers 121 from exerting a force on an edge of the key discs 112, preventing deformation of the key discs 112.

FIGS. 1c and 1d also present perspective and partial cross-sectional views, respectively, of one embodiment of a die clamp assembly 130 for use in the die positioning system 100. In the clamp assembly 130, a clamp top 131 removably secures the die D to a clamp base 135. A backplate 132 extending between the clamp top 131 and the clamp base 135 includes at least two lateral back flanges 133 to either side. Each back flange 133 includes at least one backer aperture 134 aligned with a disc aperture 114 on the key disc inserts 113. The disc backers 121 extend at least partially through each backer aperture 134. When the key discs 112 are used in system 100, the backer surface 122 at the forward surface of each disc backer 121 contacts a back surface of the key disc 112, allowing the key disc 112 to have an adjustable angle with respected to the vertical backplate 132, resulting in a better-supported angulation of the key bars 111.

A raised base surface 136 on the upper surface of the clamp base 135 also enables additional stability in clamping the die D by allowing angulation for the die D between the clamp top 131 and the clamp base 135. Because the raised base surface 136 extends parallel to yet set back from the forward edge of the clamp base 135, the die D may be angled inwardly or outwardly. The raised base surface 136 extends behind a first clamp base surface 137a and in front of a second clamp base surface 137b. Because both clamp base surfaces 137a and 137b are lower than the raised base surface 136, the die D may be angled with either a forward or backward slope, depending on the arrangement of the key discs 112.

Clamping the die D securely when using the key bars 111 and the key discs 112 requires special geometry so the system 100 works at any angle created by having a different key disc 112 and/or key bar 111 in the system 100 creating a taper. A difference in the diameter at the top and bottom of the part being rolled or special geometry require distance adjustments between the top and bottom of the die D. The disc backers 121 have a fixed distance apart; knowing this distance allows the calculation of the correct combination of key discs 112 and/or key bars 111 for each part. The backer surface 122 on the front of each disc backer 121 allows the key discs 112 to incline and align more effectively with the key bars 111 and the die D.

The raised central geometry of the raised base surface 136 on the clamp base 135 enables the die D to be clamped down securely. If the upper surface of clamp base 135 was flat, the die D would have tendency to straighten when clamped by the clamp top 131. Clearance is required on the left and right of this surface. Because the angle produced by the key discs 112 of differing thickness may be positive or negative, the raised base surface 136 is raised in the center, as seen in FIG. 1c. The central rise allows the die D to slope inwardly from the top or outwardly from the top, depending on whether the top or bottom key disc 112 is thickest, respectively.

Figure 2A:
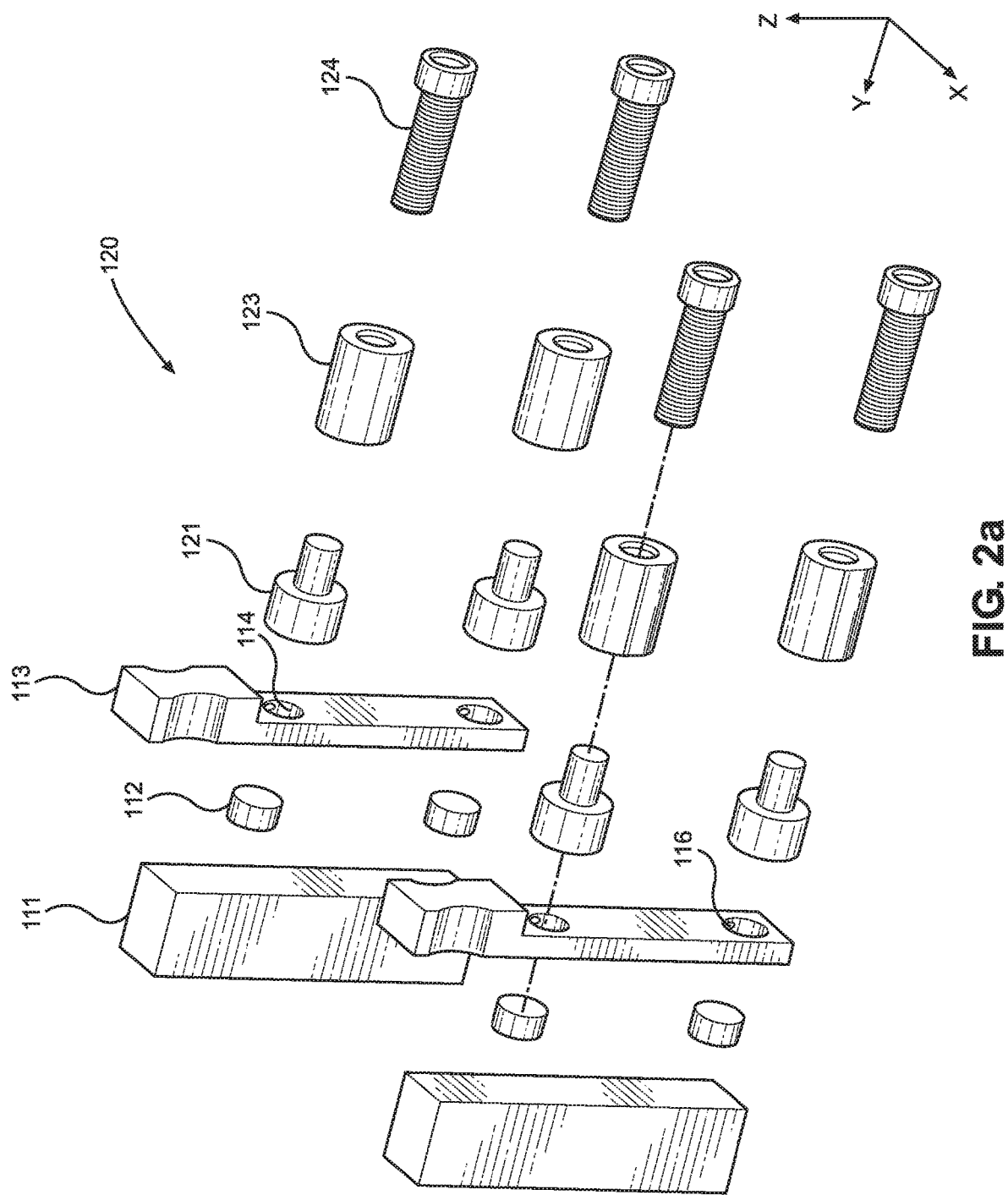
FIG. 2a depicts a perspective view of another embodiment of the key system and the disc adjustment assembly.

FIG. 2a presents a perspective view of another embodiment of the disc adjustment assembly 120 for use with the key system 110. This embodiment of the disc adjustment assembly 120 includes the previously-discussed disc backers 121, and adds a plurality of datum spacers 123 and a plurality of draw bolts 124. Each datum spacer 123 receives at least part of a disc backer 121 at one end and receives at least part of the threaded draw bolt 124 through its opposite, threaded end.

Figure 2B:
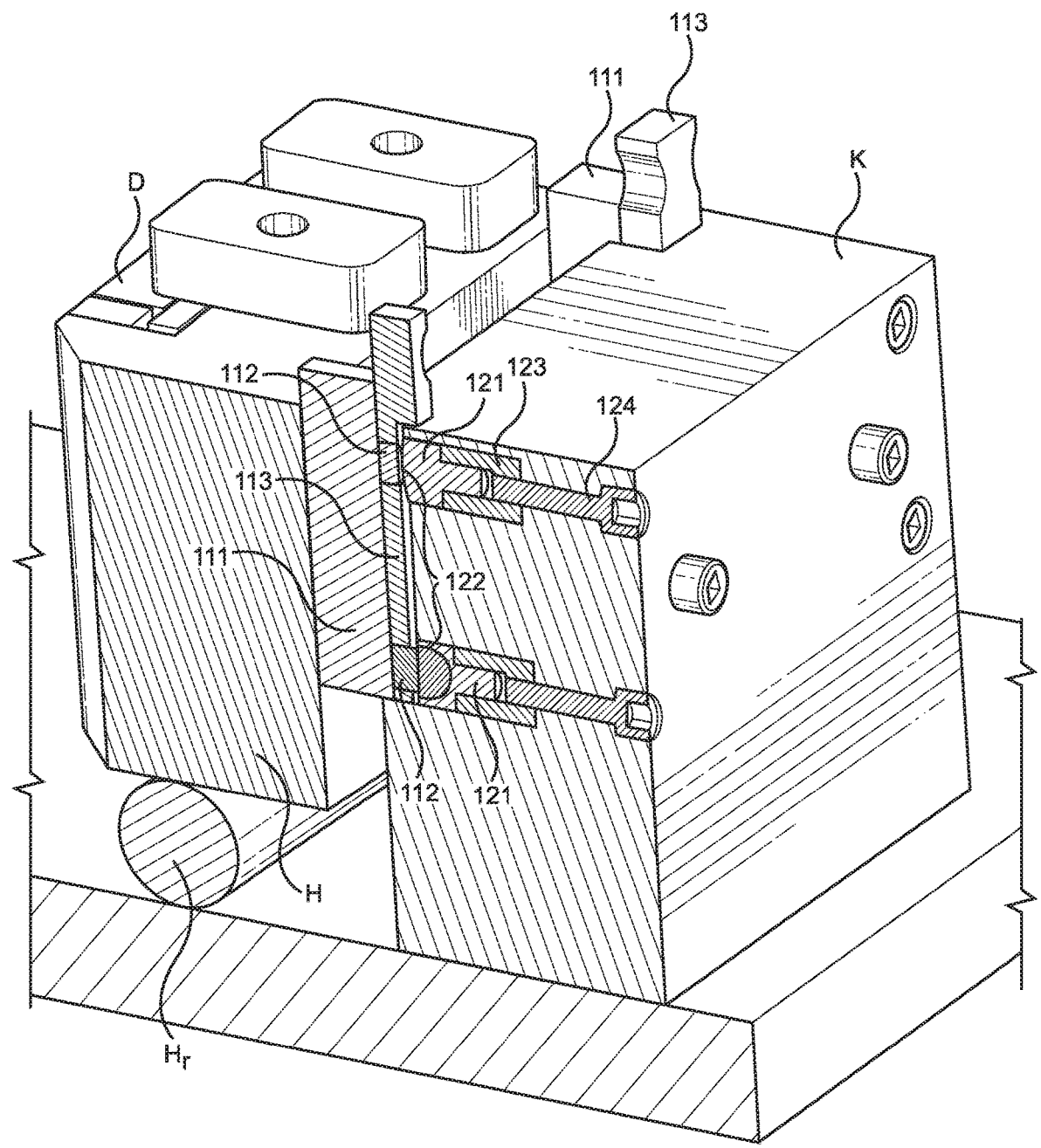
FIG. 2b depicts a partial cross-sectional view of the embodiment of the key system and the disc adjustment assembly in use.

FIG. 2b presents a cross-sectional view of the above embodiment of disc adjustment assembly 120 in use. In use, this embodiment of the assembly 120 is not placed between the die D and the die holder H, but between a key base K and the die holder H. As a result, the entire die holder H is angled and/or offset instead of just the die D. The die holder H is supported by a die holder rest Hr, which allows proper angulation of the die holder H, similarly to the way in which the raised base surface 136 allows angulation of the die D in FIG. 1c. While the die holder rest Hr has a circular cross-section in the embodiment of FIG. 2b, other cross-sectional configurations allowing angulation of the die holder H are contemplated.

Each datum spacer 123 in located in a stepped bore within the key base K. The draw bolt 124 extends from the back of the key base K through the narrower section of the bore and into the datum spacer 123 to hold the datum spacer 123 in place within the key base K. The datum spacer 123 is located in the wider section of the bore, along with the disc backer 121. Part of the disc backer 121 extends into the datum spacer 123 to hold the disc backer 121 in place within the key base K. In the embodiment of FIG. 2b, four datum spacers 123 are used; other embodiments may have more or fewer datum spacers 123. The datum spacers 123 extend parallel to each other; their longitudinal axes are parallel in XY and YZ planes.

The various embodiments of the key system 110 and the disc adjustment assembly 120 may be retrofit onto/into existing dies D and manufacturing devices. The combination of alphanumeric and/or colored indicia from the pair(s) of key bars 111 and the set(s) of key disc inserts 113 which are used with a particular die and/or manufacturing apparatus to create a particular type of fastener may be recorded and provided in a standardized listing of combinations. In certain embodiments, one of the key bars 111 and the key disc inserts 113 may have alphabetical indicia and the other of the key bars 111 and the key disc inserts 113 may have numerical indicia to facilitate easier identification. In certain embodiments, the type of fastener to be manufactured may be entered into a computer program, along with the die(s) and/or manufacturing apparatus to be used. Software algorithms may use the information to retrieve a known combination or extrapolate potential combinations from known combinations.

FIGS. 3a, 3b, and 3c show perspective, cross-sectional, and exploded views, respectively, of a bearing assembly 140 which may be used in the system 100 in conjunction with, or separately from the key system 110 and the disc adjustment assembly 120. Whether using a linear bearing or other bearing means for manufacturing threaded fasteners, it is critical that the apparatus does not oscillate vertically (up or down along the vertical axis of the fasteners, as can be seen in FIG. 3b, represented by dashed lines). All fastener blanks, especially metric or English machine fastener blanks, must have a consistent helix angle. If the helix angle varies at all, the performance of the fastener is hampered. In the art, this is called a drunken thread. Making this more complicated is the fact that all bearings, including linear bearings, require clearance (also known as play) to operate, which may result in unwanted oscillation in a direction orthogonal to the direction of motion. In certain embodiments of the die positioning system 100, a bearing assembly 140 can be added directly to a linear bearing assembly A with a reciprocating mobile die holder H to prevent this from happening. When using a linear bearing and a rack and pinion system this additional stability is a requirement to prevent a drunken thread.

As shown in FIGS. 3a, 3b, and 3c, the linear bearing assembly A includes three elements to make up a working assembly A. A base slide B is connected directly to the machine base and is stationary. The base slide B includes a stationary bearing rail Rs. In the case of a linear bearing assembly 140, a center subassembly C contains two sets of linear bearings L1 and L2 opposing each other. The center subassembly C is positionally controlled by a pinon gear P that interacts with the base slide B and a moving slide M. The moving slide M contains an additional moving bearing rail Rm.

At least one bearing assembly 140 is used in the linear bearing assembly A to prevent oscillation. Each bearing assembly 140 also includes at least three elements. At least one bearing 141 is directly attached to the base slide B or the machine base. While the embodiment shown in FIGS. 3a through 3c includes at least one bearing 141, other embodiments may include more bearings 141. At least one slide rail 142 is directly attached to mobile slide M. When the base slide B, the center subassembly C, and the moving slide M are in normal operation, the bearing 141 directly supports the moving slide M via the slide rail 142, preventing the moving slide M from experiencing any vertical oscillation. Because the bearing 141 can operate at normal manufacturing rates and pressures exerted during thread forming operations, the bearing 141 will not affect manufacturing speed for the linear bearing assembly A.

The bearing 141 and the slide rail 142 may be retrofit onto existing linear bearing assemblies A. The bearing 141 has a diameter sufficiently smaller than the inner diameter of the slide rail 142 to allow the slide rail to slide back and forth along bearing 141, but not so small as to allow the slide rail 142 to wobble uncontrollably. In various embodiments, the bearing 141 is a bushing, such as, but not limited to, a sleeve bushing or a flanged bushing. In certain embodiments, the bearing 141 is sized to provide specific support along both the upper inner surface of the slide rail 142 and the lower inner surface of the slide rail 142, respectively.

It is to be understood that this written description uses examples to disclose the invention, including the best mode, and also to enable any person skilled in the art to make anew the invention. The various embodiments of the invention may be combined in any arrangement capable of manufacturing threaded fasteners. Any dimensions or other size descriptions are provided for purposes of illustration and are not intended to limit the scope of the claimed invention. Additional embodiments can include slight variations, as well as greater variations in dimensions as required for use in the industry. The patentable scope of the invention may include other examples that occur to those skilled in the art.

The invention claimed is:

1. A die positioning system, comprising:
   a plurality of pairs of key bars, each key bar of each pair of key bars having a solid rectangular cuboid configuration identical in thickness to an other key bar of the pair of key bars;
   a plurality of sets of key discs, each key disc of each set of key discs having a solid three-dimensional shape and thickness identical to all other key discs of the set of key discs;
   at least one pair of key disc inserts, each key disc insert having at least one disc aperture extending therethrough, each key aperture having a diameter and a shape conforming to the outer periphery of each key disc; and
   at least one set of disc backers, wherein a forward surface of each disc backer comprises a backer surface having a non-planar configuration.

2. The system of claim 1, wherein at least one key disc of the set of key discs has a back surface with an at least partially spherical configuration, with a complementary mating forward surface on a front of at least one disc backer of the set of disc backers or wherein at least one disc backer of the set of disc backers has a forward surface with an at least partially spherical configuration, with a complementary mating back surface on at least one key disc of the set of key discs.

3. The system of claim 1, wherein at least one disc backer of the at least one set of disc backers has a forward surface with a convex angled configuration.

4. The system of claim 1, further comprising a die, wherein the die is a stationary die or a mobile die.

5. The system of claim 1, further comprising a die holder and a die, wherein at least one pair of key bars, the at least one pair of key disc inserts, and the at least one set of disc backers are located between a die holder and a die.

6. The system of claim 5, wherein at least one key disc from one set of key discs and at least one other key disc from one other set of key discs are located between the die holder and the die to angle the die.

7. The system of claim 5, wherein one key bar and one key disc insert extend along a first end of one side of the die, wherein the other key bar and the other key disc insert extend along a second end of the same side of the die.

8. The system of claim 5, wherein each key disc insert has a stepped configuration between a thicker section and a thinner section, the thicker section extending above the die holder with the step holding the key disc insert in place vertically with respect to the die and the die holder.

9. The system of claim 1, wherein at least one pair of key bars, the at least one pair of key disc inserts, at least one set of key discs, and the at least one set of disc backers are located between a key base and a die holder to angle or displace the die holder.

10. The system of claim 9, wherein at least one key disc from one set of key discs and at least one other key disc from one other set of key discs are located between the die holder and the key base to angle the die.

11. The system of claim 9, wherein one key bar and one key disc insert extend along a first end of one side of the die holder, wherein the other key bar and the other key disc insert extend along a second end of the same side of the die holder.

12. The system of claim 9, wherein the die holder is supported by a die holder rest.

13. A die positioning system, comprising:
    at least one pair of key bars, each key bar of the pair of key bars having a solid rectangular cuboid configuration identical to the other key bar of the pair of key bars;
    at least one set of key discs, each key disc of the set of key discs having a solid three-dimensional shape and size identical to the other key discs of the set of key discs;
    at least one pair of key disc inserts, each key disc insert having at least one disc aperture extending therethrough, each key aperture having a diameter and a shape conforming to the outer periphery of each key disc; and
    at least one set of disc backers, wherein the forward surface of each disc backer comprises a backer surface having a non-planar configuration;
    at least one bearing mounted to a base slide; and
    at least one slide rail mounted to a moving slide, the mounted slide having a line of motion,
    wherein the at least one bearing is mounted to the base slide such that the axis of rotation of each of the at least one bearing is orthogonal to the line of motion,
    wherein the at least one slide rail receives the at least one bearing such that the at least one bearing contacts at least one of an upper inner surface of the at least one slide rail or a lower inner surface of the at least one slide rail.

14. The system of claim 13, wherein the bearing is a bushing.

15. The system of claim 13, further comprising a clamp top, backplate, and clamp base mounted to the slide rail, wherein the die is removably located between the clamp top and the clamp base.

16. The system of claim 15, wherein the clamp base comprises a raised base surface, the raised base surface extending parallel to a forward edge of the clamp base.

17. The system of claim 16, wherein a clamp base surface extends between the backplate and the raised base surface.

18. The system of claim 16, wherein a clamp base surface extends between the forward edge of the clamp base and the raised base surface.

19. The system of claim 15, wherein the backplate comprises a plurality of back flanges extending laterally from a first lateral side of the backplate and a second lateral side of the backplate.

20. The system of claim 19, wherein each back flange comprises at least one backer aperture aligned with the at least one disc aperture of one key disc insert of the at least one pair of key disc inserts.

* * * * *